United States Patent [19]

Bertrand

[11] Patent Number: 4,896,591
[45] Date of Patent: Jan. 30, 1990

[54] CITRUS FRUIT SQUEEZER

[76] Inventor: Michel Bertrand, La Lombardière, Luzinay, France, 38200

[21] Appl. No.: 273,970

[22] Filed: Nov. 21, 1988

[51] Int. Cl.⁴ .............................................. A23N 1/00
[52] U.S. Cl. ...................................... 99/507; 99/508; 100/112; 100/213; 100/215; 100/218
[58] Field of Search ........................ 99/495, 501–508; 100/97, 112, 125, 215, 218, 213, 208, 264, 268

[56] References Cited

U.S. PATENT DOCUMENTS

| | | | |
|---|---|---|---|
| 1,661,374 | 3/1928 | Lacey | 100/213 |
| 1,933,621 | 11/1933 | Elliott et al. | 99/507 |
| 2,311,565 | 2/1943 | Nelson | 100/97 |
| 2,404,382 | 7/1946 | Klein | 100/213 |
| 2,629,317 | 2/1953 | Nelson | 99/508 X |
| 3,272,116 | 9/1966 | White et al. | 100/112 |

Primary Examiner—Timothy F. Simone
Attorney, Agent, or Firm—Dowell & Dowell

[57] ABSTRACT

This invention relates to a device for squeezing citrus fruits, which comprises an ejector formed by a circular grille whose radial arms are slidably engaged in slots made in an ogive-shaped body to allow lowering of the grille, whose return is effected by a helical spring interposed between the base of the body and the arms.

3 Claims, 3 Drawing Sheets

CITRUS FRUIT SQUEEZER

FIELD OF THE INVENTION

The present invention relates to the squeezing of lemons, oranges and other citrus fruits for the purpose of obtaining juice to be consumed as beverages.

BACKGROUND OF THE INVENTION

Automatically operating machines are known, which comprise, in combination, an upper hopper for storing and conveying the citrus fruits to be squeezed, a cutting mechanism adapted to cut each fruit into two halves, two squeezing devices adapted to squeeze out the juice from these two halves separately, and a transfer mechanism adapted to convey the halves to the devices and to evacuate the skins on leaving the devices. U.S. Pat. Nos. 3,272,116 (WHITE), 2,629,317 (NELSON) and 2,311,565 (NELSON) clearly illustrate the prior known technique.

Each squeezing device generally comprises a fixed body in ogive form which is associated, on the one hand, with a squeezer animated by a reciprocating movement oriented axially with respect to the body, on the other hand, with a retractable ejector adapted automatically to disengage the squeezed skin. This ejector is most often formed by two scalloped horizontal walls which surround the ogive to form support for the half of fruit to be squeezed and which are guided obliquely so as to lower and move apart from each other under the effect of the pressure exerted on the half of fruit by the mobile squeezer, then to rise under the action of an elastic members, ejecting the skin when this squeezer rises itself.

Experience has shown that such an arrangement does not give entire satisfaction in practice. Its complex construction increases the cost price of the squeezing device, at the same time as rendering the automatic operation thereof less reliable and hindering its cleaning after use.

It is an object of the present invention to overcome these drawbacks.

SUMMARY OF THE INVENTION

To that end, the invention provides a device for mechanically squeezing citrus fruits, of the type comprising a fixed body in ogive form, a squeezer animated by a reciprocating movement oriented axially with respect to the body, and a retractable ejector associated with an elastic member which enable it to retract under the effect of the pressure exerted by the squeezer on the half of fruit to be treated and which ensure return thereof and ejection of the skin upon return of this squeezer, characterized in that the ejector is constituted by a circular grille of which the radial arms are engaged in slots made longitudinally in the ogive body, while the elastic return member is disposed between said grille and the base of this body.

In fact, the invention essentially consists in constituting the ejector in the form of a grille of circular profile of which the radial arms slide vertically in longitudinal slots of the fixed ogive body, the elastic member, disposed between the grille and the base of the ogive body, advantageously being constituted by a helical spring interposed between the arms of the grille and flange elements secured with the base of the body.

BRIEF DESCRIPTION OF THE DRAWINGS

The invention will be more readily understood on reading the following description with reference to the accompanying drawings, in which.

DETAILED DESCRIPTION OF THE DRAWINGS

Figure 1:
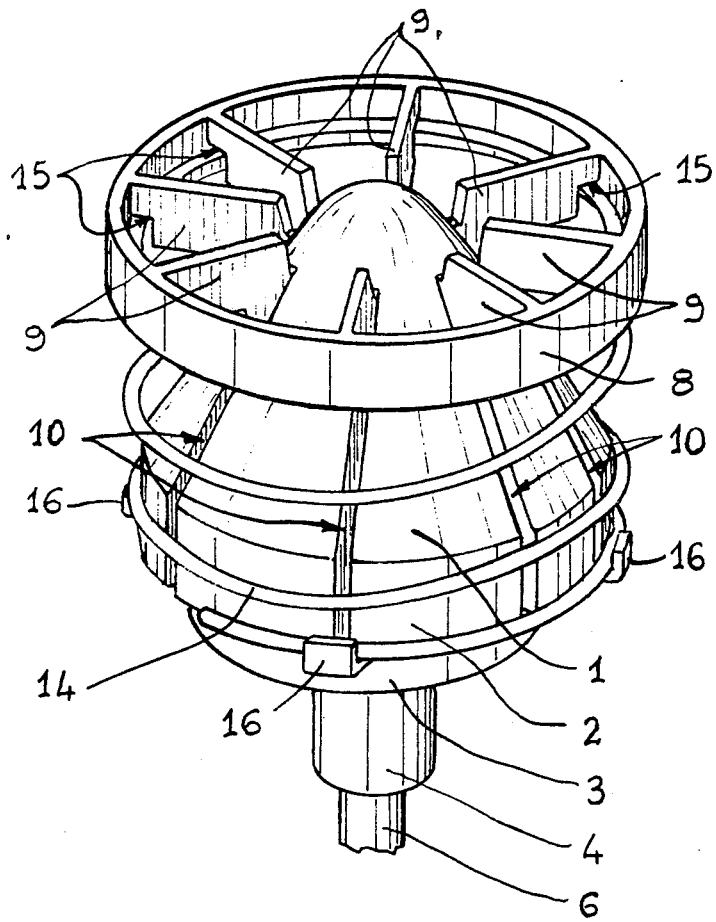
FIG. 1 is a view in perspective illustrating the general arrangement of a squeezing device according to the invention.

Referring now to the drawings, reference 1 designates the fixed body, in the form of ogive, of the squeezing device. This body 1, provided to be hollow, comprises a base 2 of cylindrical form which joins, via a dismountable plate 3, an axial hub 4 adapted to be fixed, for example with the aid of a set screw such as 5, to a vertical support 6, which passes through a fixed collector 7. It will be observed that the upper face of the plate 3 is sectioned obliquely to allow the juice to flow, the juice finally being collected by the collector 7 which guides it towards a pouring member (not shown).

The squeezing device also comprises an ejector constituted by a grille 8 of circular profile whose diameter is slightly greater than that of the cylindrical base 2 of the body 1. The annular part of this grille 8 comprises radial arms 9 slidably engaged in longitudinal slots 10 made in the body 1. It will be noted that the arms 9 are connected in the central part of the grille 8 in order to form an axial ring 11 which is guided inside a hub 12 defined by the vertical edge of inner struts 13 of the body 1.

The ejector or grille 8 is connected to the fixed body 1 by a helical spring 14 whose upper turn abuts in notches 15 made in the arms 9, while the lower turn is applied against small angles or flanges 16 added, for example by welding, on the lower edge of the cylindrical base 2 of the body 1.

The squeezing device is conventionally completed by a squeezer 17 in the form of a downwardly open funnel, adapted to cover the body or ogive 1. This squeezer 17 is fixed, for example by a screw 18, to the lower end of a rod 19 animated by a vertical reciprocating movement.

Operation of the squeezing device described hereinabove follows from the foregoing explanations and will consequently be readily understood.

Figure 3:
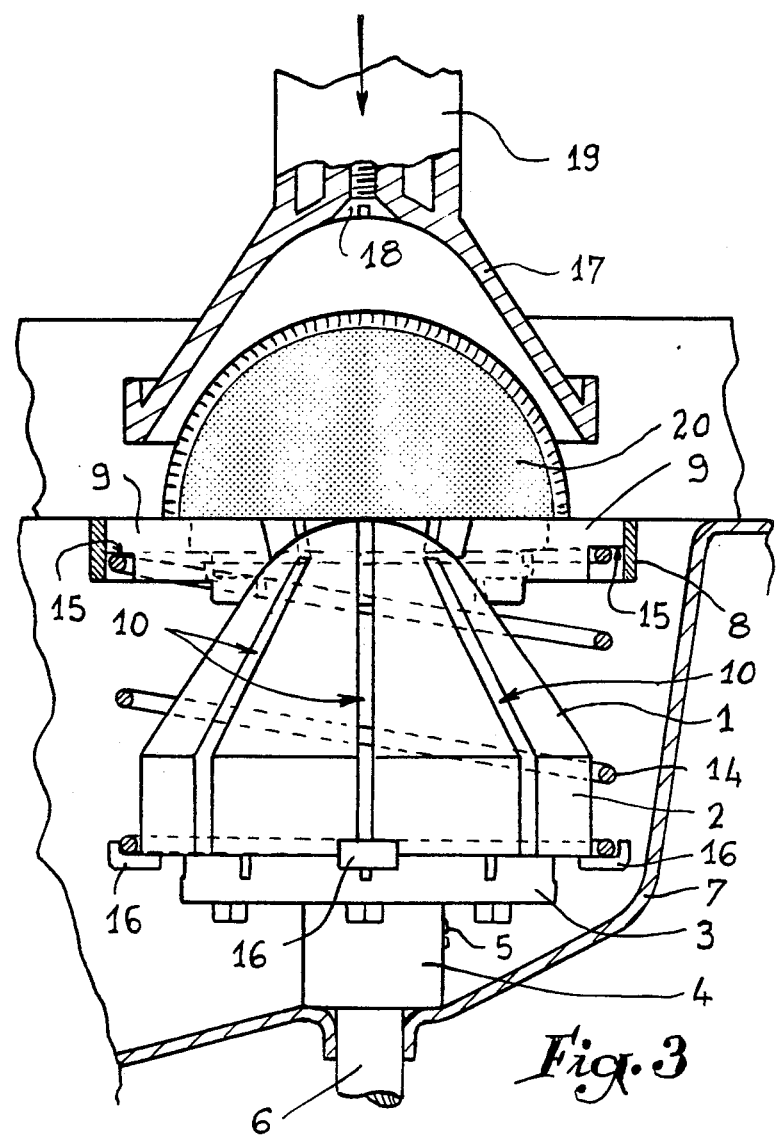
FIG. 3 reproduces FIG. 2, with the ejector in a raised position.

When the squeezer 17 is in its highest position for which is completely clears the space located above the device, a half of fruit 20 may be placed on the grille 8 itself in raised position. When the squeezer 17 lowers in the manner illustrated in FIG. 3, it abuts against the half 20 which it pushes downwardly, so that the grille 8 is itself displaced in the same direction against the spring 14 by slide of the arms 9 in the slots 10. Further to the penetration of the body 1 in the half 20, the latter is pressed, the juice thereof flowing along body 1 and through slots 10.

Figure 2:
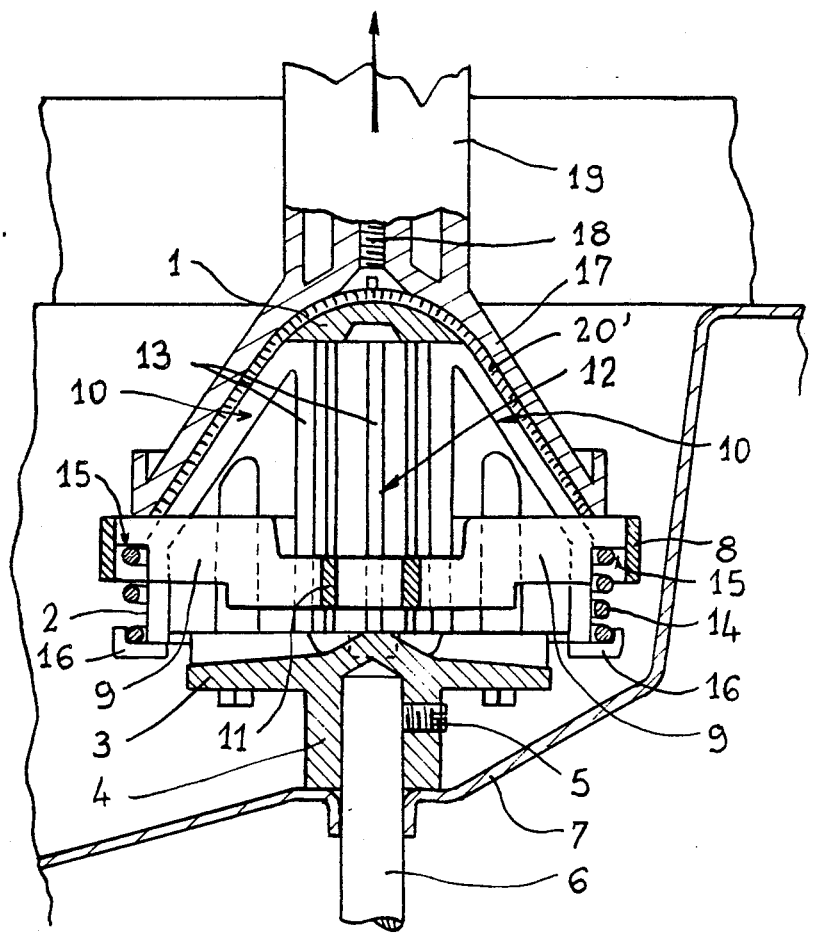
FIG. 2 is an axial section thereof, the ejector being shown in low, end-of-squeezing position.

FIG. 2 illustrates the end of the squeezing operation. When the squeezer 17 will rise, the grille or ejector 8 moves upwardly under the effect of spring 14, driving skin 20' of the fruit out of the body 1. In raised position, this skin 20' may be evacuated laterally.

Construction of the device is simple and perfectly reliable.

What is claimed is:

1. In a device for mechanically squeezing citrous fruits of the type which includes a fixed body in a generally ogive form, a squeezer axially moveable with respect to the longitudinal axis of the body, a retractable ejector axially moveable with respect to the body and elastic return means which enable the ejector to retract under the effect of pressure exerted by the squeezer as the squeezer urges a half of fruit to be squeezed toward the body and which elastic return means returns the squeezer and ejects the skin of the fruit half after the fruit has been squeezed the improvement comprising, a plurality of spaced slots formed in the body so as to extend generally longitudinally with respect to the longitudinal axis of the body, said body having a base portion and an uppermost portion and inner and outer surfaces, the ejector including a generally circular grille having a plurality of spaced arms which extend radially outwardly so as to be oriented radially with respect to the axis of the body, said radial arms of the ejector being slideably received within said spaced slots in the body, and the elastic return means being disposed intermediate the ejector and said base of the body whereby the ejector will be positively guided between adjacent said uppermost portion of the body toward the base portin thereof by said radial arms being guidingly received within said slots in the body.

2. The device of claim 1 in which each of said radial arms includes an innermost end, said innermost ends of said radial arms being joined to a ring, and guide means depending from said inner surface of the body for positively guiding said ring with respect to the elongated axis of the body as the ejector is moved with respect thereto.

3. The device of claim 2 wherein the elastic return means includes a helical spring having first and second ends, said helical spring being seated in surrounding relationship to the body, said first end of said spring engaging said radial arms of said grille and means for seating said second end of said spring adjacent to said base portion of the body.

* * * * *